US012658083B2

(12) United States Patent
Choi et al.

(10) Patent No.: US 12,658,083 B2
(45) Date of Patent: Jun. 16, 2026

(54) DISPLAY DEVICE, METHOD OF GENERATING COMPENSATION DATA FOR DISPLAY DEVICE, AND DEVICE FOR GENERATING COMPENSATION DATA

(71) Applicant: Samsung Display Co., Ltd., Yongin-Si (KR)

(72) Inventors: Hak Mo Choi, Yongin-si (KR); Se Yun Kim, Yongin-si (KR); Hyung Woo Yim, Yongin-si (KR); Hui Su Kim, Yongin-si (KR); Seung Ho Park, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/732,137

(22) Filed: Jun. 3, 2024

(65) Prior Publication Data

US 2025/0061827 A1 Feb. 20, 2025

(30) Foreign Application Priority Data

Aug. 17, 2023 (KR) ........................ 10-2023-0107478

(51) Int. Cl.

*G09G 3/00* (2006.01)
*G09G 3/20* (2006.01)
*G09G 3/32* (2016.01)

(52) U.S. Cl.

CPC ........... *G09G 3/006* (2013.01); *G09G 3/2074* (2013.01); *G09G 3/32* (2013.01); *G09G 3/2096* (2013.01); *G09G 2300/0819* (2013.01); *G09G 2300/0852* (2013.01); *G09G 2310/027* (2013.01); *G09G 2310/08* (2013.01); *G09G 2320/0233* (2013.01); *G09G 2320/0242* (2013.01)

(58) Field of Classification Search

CPC ........ G09G 3/006; G09G 3/2074; G09G 3/32; G09G 3/2096; G09G 2300/0819; G09G 2300/0852; G09G 2310/027; G09G 2310/08; G09G 2320/0233; G09G 2320/0242; G09G 3/3233; G09G 2320/0271; G09G 2330/028; H04N 17/004

See application file for complete search history.

(56) References Cited

U.S. PATENT DOCUMENTS

| | | | |
|---|---|---|---|
| 9,262,964 | B2 | 2/2016 | Nam et al. |
| 10,026,350 | B2 | 7/2018 | Jun et al. |
| 11,170,713 | B2 | 11/2021 | Jeon et al. |

(Continued)

FOREIGN PATENT DOCUMENTS

| | | | |
|---|---|---|---|
| KR | 10-20200094862 | A | 8/2020 |
| KR | 10-2425404 | B1 | 7/2022 |

*Primary Examiner* — Chanh D Nguyen
*Assistant Examiner* — Gloryvid Figueroa-Gibson
(74) *Attorney, Agent, or Firm* — Innovation Counsel LLP

(57) ABSTRACT

A method of generating compensating data for a pixel circuit differences in a display device includes displaying a test image of pixels of the display device; generating a first camera image by photographing the test image; applying a test input signal to each of the pixels and sensing corresponding test outputs, wherein the test input signal is at least one of a test current and a test voltage; generating weights for the pixels based on the test outputs; generating a second camera image by applying the weights to the first camera image; and generating compensation data for the pixels based on the second camera image.

20 Claims, 16 Drawing Sheets

(56) References Cited

U.S. PATENT DOCUMENTS

| | | | | |
|---|---|---|---|---|
| 2014/0160174 | A1* | 6/2014 | Tsuei | G09G 5/06 345/690 |
| 2014/0176625 | A1* | 6/2014 | Yoon | G09G 3/3233 345/691 |
| 2015/0154908 | A1* | 6/2015 | Nam | G09G 3/3233 345/76 |
| 2017/0116904 | A1* | 4/2017 | Jun | G09G 3/3258 |
| 2020/0005691 | A1* | 1/2020 | Yoo | G09G 3/006 |

* cited by examiner

<TRANSISTOR THRESHOLD VOLTAGE SENSING PERIOD>

<DIODE THRESHOLD VOLTAGE SENSING PERIOD>

FIG. 10

AR1 STAB1

| | | | | | | | | |
|---|---|---|---|---|---|---|---|---|
| 2034 | 2034 | 2036 | 2035 | 2033 | 2037 | 2039 | 2037 | 2041 |
| 2039 | 2046 | 2035 | 2035 | 2016 | 2042 | 2040 | 2041 | 2035 |
| 2033 | 2036 | 2034 | 2034 | 2021 | 1991 | 2040 | 2042 | 2036 |
| 2038 | 2037 | 2033 | 2012 | 1917 | 1973 | 2040 | 2038 | 2041 |
| 2035 | 2040 | 2034 | 2037 | 1912 | 2002 | 2041 | 2041 | 2040 |
| 2039 | 2037 | 2040 | 2038 | 1982 | 2035 | 2041 | 2040 | 2038 |
| 2038 | 2033 | 2036 | 2038 | 2034 | 2044 | 2041 | 2043 | 2042 |
| 2040 | 2042 | 2034 | 2035 | 2029 | 2039 | 2038 | 2039 | 2045 |
| 2033 | 2038 | 2034 | 2041 | 2027 | 2037 | 2044 | 2040 | 2042 |

FIG. 11

AR1 STAB2

| | | | | | | | | |
|---|---|---|---|---|---|---|---|---|
| 99.8% | 99.8% | 99.9% | 99.9% | 99.8% | 100.0% | 100.1% | 100.0% | 100.2% |
| 100.1% | 100.4% | 99.9% | 99.9% | 98.9% | 100.2% | 100.1% | 100.2% | 99.9% |
| 99.8% | 99.9% | 99.8% | 99.8% | 99.2% | 97.7% | 100.1% | 100.2% | 99.9% |
| 100.0% | 100.0% | 99.8% | 98.7% | 94.1% | 96.87 | 100.1% | 100.0% | 100.2% |
| 99.9% | 100.1% | 99.8% | 100.0% | 93.8% | 98.3% | 100.2% | 100.2% | 100.1% |
| 100.1% | 100.0% | 100.1% | 100.0% | 97.3% | 99.9% | 100.2% | 100.1% | 100.0% |
| 100.0% | 99.8% | 99.9% | 100.0% | 99.8% | 100.3% | 100.2% | 100.3% | 100.2% |
| 100.1% | 100.2% | 99.8% | 99.9% | 99.6% | 100.1% | 100.0% | 100.1% | 100.4% |
| 99.8% | 100.0% | 99.8% | 100.2% | 99.5% | 100.0% | 100.3% | 100.1% | 100.2% |

DISPLAY DEVICE, METHOD OF GENERATING COMPENSATION DATA FOR DISPLAY DEVICE, AND DEVICE FOR GENERATING COMPENSATION DATA

CROSS-REFERENCE TO RELATED APPLICATION

This application claims priority to and the benefit of Korean Patent Application No. 10-2023-0107478 filed in the Korean Intellectual Property Office on Aug. 17, 2023, the entire contents of which are incorporated herein by reference.

BACKGROUND

1. Field

The present disclosure relates to a display device, a generating method of compensation data for the display device, and a generating device of the compensation data.

2. Description of the Related Art

As information technology is developed, the role of a display device, which is a connection medium between users and information, becomes increasingly important. As a result, a display devices such as a liquid crystal display device, an organic light emitting diode display device, and the like are increasing in popularity.

A display device displays an image using a plurality of pixels. A plurality of pixels may have the same pixel circuit structure. However, as display devices become larger, there may be differences in electrical characteristics even for the same pixel circuits.

Even if the differences in electrical characteristics between pixel circuits are compensated for, stains or discoloration may occur during the manufacturing process of the display device. Therefore, optical compensation can be performed by photographing a test image of the display device using an optical system.

However, due to limitations of the optical system, such as Moire phenomenon, precise optical compensation at a sub-pixel level is difficult.

SUMMARY

The disclosure provides a display device capable of precisely performing optical compensation, a generating method of compensation data for the display device, and a generating device of the compensation data.

A method of compensating for pixel circuit differences in a display device according to an embodiment of the present disclosure includes displaying a test image of pixels in the display device; generating a first camera image by photographing the test image; applying a test input signal to each of the pixels and sensing corresponding test outputs, wherein the test input signal is at least one of a test current and a test voltage; generating weights for the pixels based on the test outputs; generating a second camera image by applying the weights to the first camera image; and generating compensation data for the pixels based on the second camera image.

The test outputs may include at least one of a threshold voltage of driving transistors of the pixels, a mobility of the pixels, and a threshold voltage of light emitting elements of the pixels.

A size of a stain disposed in a first area of the first camera image may be larger than a size of a stain disposed in a corresponding area of the second camera image, the corresponding area and the first area representing the same part of a pixel of the pixels.

The generating of the second camera image may include multiplying the weights to corresponding grayscales of the first camera image.

The method of the compensation data may further include storing the compensation data in a memory of the display device.

The compensation data may be stored in the memory without first camera image and the second camera image.

The compensation data may include compensation grayscales for the pixels, and a compensation grayscale of the compensation data may be larger as a grayscale of the second camera image of the pixel is smaller.

Each of the pixels may include a first sub-pixel of a first color, a second sub-pixel of a second color, and a third sub-pixel of a third color, and the generating the first camera image, the generating the second camera image, and the generating the compensation data may be independently performed for each of the first sub-pixel, the second sub-pixel, and the third sub-pixel.

Each of the pixels may include a first sub-pixel of a first color, a second sub-pixel of a second color, and a third sub-pixel of a third color, and the generating the first camera image, the generating the second camera image, and the generating the compensation data may be performed for the first sub-pixel, the second sub-pixel, and the third sub-pixel in a coordinated order.

A device for generating compensation data for pixels according to an embodiment of the present disclosure includes a camera that generates a first camera image by photographing test images displayed by pixels of a display device; and a test controller that inputs a test input signal to each of the pixels and senses corresponding test outputs, the test input signal being a test current or a test voltage, wherein the test controller generates weights for the pixels based on the test outputs, generates a second camera image by applying the weights to the first camera image, and generates compensation data for the pixels using the second camera image.

The test outputs may include at least one of a threshold voltage of driving transistors of the pixels, a mobility of the pixels, and a threshold voltage of light emitting elements of the pixels.

A size of a stain disposed in a first area of the first camera image may be larger than a size of a stain disposed in a corresponding area of the second camera image, the corresponding area and the first area representing the same part of a pixel of the pixels.

The second camera image may be generated by multiplying the weights to corresponding grayscales of the first camera image.

The test controller may store the compensation data in a memory of the display device.

The compensation data may be stored in the memory without the first camera image and the second camera image.

The compensation data may include compensation grayscales for the pixels, and a size of a compensation grayscale of the compensation data may be inversely proportional to a size of a grayscale of the second camera image of the pixel.

A display device according to an embodiment of the present disclosure includes a plurality of pixels; a sensing unit that senses corresponding test outputs from the pixels to which a test input signal is applied, the test input signal being at least one of a current or test voltage; a memory that provides first compensation data that is optical compensation data; and a compensation data correction unit that generates second compensation data by applying weights based on the test outputs to the first compensation data.

The first compensation data may be maintained without change, and when the test outputs are updated, the second compensation data may be updated.

The display device may further include a timing controller that generates output grayscales by applying the second compensation data to input grayscales for the pixels.

The display device may further include a data driver that generates data voltages corresponding to the output grayscales and supplies the data voltages to the pixels.

A display device, a generating method of compensation data for the display device, and a generating device of compensation data according to the present disclosure can precisely perform optical compensation.

BRIEF DESCRIPTION OF THE DRAWINGS

FIGS. 9 and 10 are drawings for illustrating test outputs according to an embodiment of the present disclosure.

FIG. 11 is a drawing for illustrating weights according to an embodiment of the present disclosure.

DETAILED DESCRIPTION OF THE EMBODIMENTS

Figure 1:
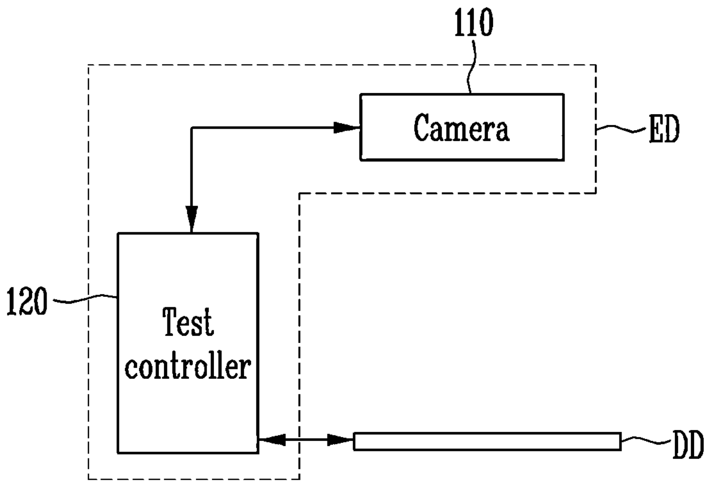
FIG. 1 is a drawing for illustrating a generating device of compensation data according to an embodiment of the present disclosure.

Hereinafter, various embodiments of the present disclosure will be described in detail with reference to accompanying drawings, so that those skilled in the art can easily carry out the present disclosure. The present disclosure may be embodied in many different forms and is not limited to the embodiments described herein.

To clearly illustrate the present disclosure, parts that are not related to the description are omitted, and the same or similar constituent elements are given the same reference numerals throughout the specification. Therefore, the above-mentioned reference numerals can be used in other drawings.

In addition, since the size and thickness of each configuration shown in the drawing are selected for better understanding and clarity of description, the present disclosure is not necessarily limited to the relative dimensions depicted. In the drawings, the dimensions of layers and regions are exaggerated for clarity of illustration.

The expression “the same” in the description may mean “substantially the same,” such that a person with ordinary skill in the art would understand the multiple elements to serve the same purpose the as intended.

FIG. 1 is a drawing for illustrating a generating device of compensation data according to an embodiment of the present disclosure.

Referring to FIG. 1, a generating device of compensation data (ED) according to an embodiment of the present disclosure may include a camera 110 and an test controller 120.

The camera 110 may generate a camera image by photographing a test image displayed by pixels of the display device DD. The camera 110 may be composed of various luminance meters, optical systems, etc.

The test controller 120 may input a test current or test voltage to each of pixels of the display device DD and sense corresponding test outputs. The test controller 120 may be composed of a general-purpose or dedicated computing device. A computing device may include a recording medium and a processor. The recording medium and processor may be physically included in the same device, but may also be included in physically different devices using cloud technology, etc.

The recording media includes all types of recording devices that can store data or programs that can be read by the processor. Examples of the recording media that can be read by the processor may include a ROM, a RAM, a CD-ROM, a magnetic tape, a floppy disk, an optical data storage device, a hard disk, an external hard disk, a SSD, a USB storage device, a DVD, and a blue-ray disk. Additionally, the recording medium that can be read by the processor may be a combination of multiple devices or may be distributed in a computer system connected to a network. This recording medium may be a non-transitory computer readable medium. The non-transitory computer readable medium may refer to a medium that can store data or programs semi-permanently and can be read by the processor, rather than a medium that stores data or programs for a short time, such as registers, caches, and memories.

Figure 2:
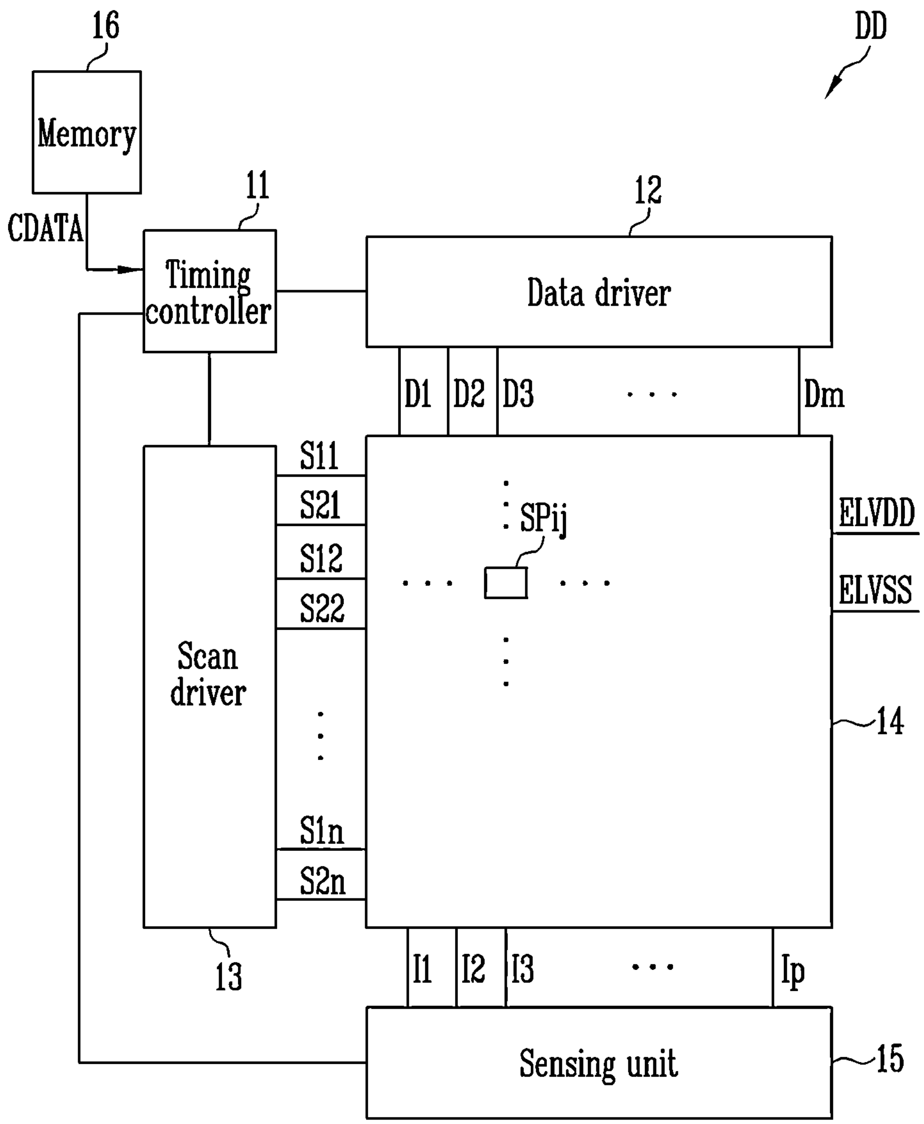
FIG. 2 is a drawing for illustrating a display device according to an embodiment of the present disclosure.

FIG. 2 is a drawing for illustrating a display device according to an embodiment of the present disclosure.

Referring to FIG. 2, the display device DD according to an embodiment of the present disclosure includes a timing controller 11, a data driver 12, a scan driver 13, a pixel unit 14, a sensing unit 15, and memory 16.

The memory 16 includes all types of recording devices capable of writing or reading data. The memory 16 may be an external memory or an internal memory of the timing controller 11. Additionally, the memory 16 may be an internal memory of another device. The memory 16 may include compensation data CDATA. The compensation data CDATA may be optical compensation data and may be created in advance before product shipment and stored in the memory 16. In the process of using the display device DD, the compensation data CDATA may remain unchanged.

The timing controller 11 may receive input grayscales and control signals for each frame (e.g., image frame) from the processor. Here, the processor may correspond to at least one of a graphics processing unit (GPU), a central processing unit (CPU), and an application processor (AP).

The timing controller 11 may convert the input grayscales to generate output grayscales. At least one of sensing data provided by the sensing unit 15 and compensation data CDATA provided by the memory 16 may be used to generate output grayscales.

For example, the timing controller 11 may generate output grayscales by converting the input grayscales using sensing data provided by the sensing unit 15. For example, the timing controller 11 may generate the output grayscales by converting the input grayscales using compensation data CDATA provided by the memory 16. For example, the timing controller 11 may generate intermediate grayscales by converting the input grayscales using sensing data, and may generate the output grayscales by converting the intermediate grayscales using the compensation data CDATA. Compensation using the sensing data can compensate for the dispersion of electrical characteristics of pixel circuits. Compensation using the compensation data CDATA can compensate for stains, discoloration, etc. that occur during the manufacturing process of the display device DD. Selection or application order of application data may vary according to the embodiment.

The timing controller 11 may provide the output grayscales to the data driver 12. Additionally, the timing controller 11 may provide control signals suitable for the specifications of each of the data driver 12, the scan driver 13, and the sensing unit 15.

In the display period, the data driver 12 may use the output grayscales and control signals received from the timing controller 11 to generate data voltages to be provided to the data lines D1, D2, D3, . . . , Dm. For example, the data driver 12 may sample output grayscales using a clock signal and convert the sampled output grayscales into data voltages. The data driver 12 may apply data voltages to the data lines D1 to Dm in unit of a pixel row. m may be an integer greater than zero. Here, the pixel row refer to pixels (or sub-pixels) connected to the same scan lines. During the sensing period, the data driver 12 may supply reference voltages to the data lines D1 to Dm.

The scan driver 13 may receive a clock signal, a scan start signal, etc. from the timing controller 11 to generate first scan signals to be provided to the first scan lines S11, S12, . . . , S1*n* and second scan signals to be provided to the second scan signals S21, S22, . . . , S2*n*. n may be an integer greater than zero.

The scan driver 13 may sequentially supply first scan signals having a pulse at a turn-on level to the first scan lines S11 to Sin. Additionally, the scan driver 13 may sequentially supply second scan signals having a pulse at a turn-on level to the second scan lines S21 to S2*n*. The scan driver 13 may include a first scan driver connected to the first scan lines S11, S12, and Sin and a second scan driver connected to the second scan lines S21, S22, and S2*n*. Each of the first scan driver and the second scan driver may include scan stages formed of a form of a shift register. Each of the first scan driver and the second scan driver may generate scan signals by sequentially transferring a scan start signal which is a pulse form of a turn-on level to the next scan stage under a control of a clock signal.

In the display period, the sensing unit 15 may supply an initialization voltage to the sensing lines I1, I2, I3, . . . , and Ip. p may be an integer greater than zero. In the sensing period, the sensing unit 15 may receive sensing voltages from the sensing lines I1 to Ip connected to the pixels (or sub-pixels).

The sensing unit 15 may include sensing channels connected to the sensing lines I1 to Ip. For example, the sensing lines I1 to Ip and the sensing channels may correspond one to one. For example, the number of the sensing lines I1 to Ip and the number of the sensing channels may be the same. In another embodiment, the number of the sensing channels may be less than the number of the sensing lines I1 to Ip. At this time, the sensing unit 15 may further include demultiplexers to perform sensing of the pixels (or sub-pixels) in a time-division manner.

The pixel unit 14 includes a plurality of pixels. Each pixel may include a first sub-pixel that emits light of a first color, a second sub-pixel that emits light of a second color, and a third sub-pixel that emits light of a third color. The first color, second color, and third color may be different colors.

Each sub-pixel SPij may be connected to a corresponding data line, a scan line, and a sensing line. The pixels (or sub-pixels) may be connected to a common first power line ELVDD and a common second power line ELVSS. For example, during the display period, the voltage of the first power line ELVDD may be greater than the voltage of the second power line ELVSS.

According to an embodiment, at least two of the timing controllers 11, the data driver 12, the scan driver 13, the pixel unit 14, the sensing unit 15, and the memory 16 may be composed of an integrated chip (IC). Separating or integrating each functional unit shown in FIG. 1 falls within the scope that can be easily changed by a person skilled in the art, and description of f all possibilities will be omitted.

Figure 3:
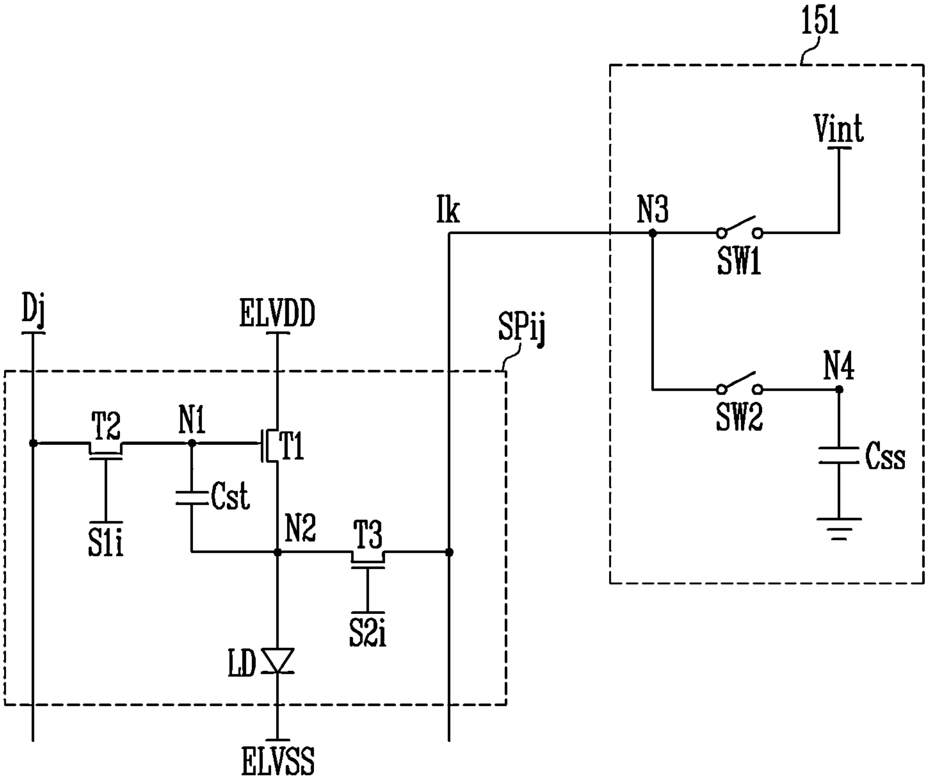
FIG. 3 is a drawing for illustrating a pixel and a sensing channel according to an embodiment of the present disclosure.

FIG. 3 is a drawing for illustrating a pixel and a sensing channel according to an embodiment of the present disclosure.

The sub-pixel SPij may include transistors T1, T2, and T3, a storage capacitor Cst, and a light emitting diode LD.

The transistors T1, T2, and T3 may be composed of N-type transistors. In another embodiment, the transistors T1, T2, and T3 may be composed of P-type transistors. In another embodiment, the transistors T1, T2, and T3 may be composed of a combination of an N-type transistor and a P-type transistor. The P-type transistor is a general term for a transistor in which the amount of the current to be conducted increases when a voltage difference between the gate electrode and the source electrode increases in a negative direction. The N-type transistor is a general term for a transistor in which the amount of the current to be conducted increases when a voltage difference between the gate electrode and the source electrode increases in a positive direction. The transistor may be composed of various forms, such as a thin film transistor (TFT), a field effect transistor (FET), a bipolar junction transistor (BJT), and the like.

The first transistor T1 may have a gate electrode connected to the first node N1, a first electrode connected to the first power line ELVDD, and a second electrode connected to the second node N2. The first transistor T1 may be referred to as a driving transistor.

The second transistor T2 may have a gate electrode connected to the first scan line S1*i*, a first electrode connected to the data line Dj, and a second electrode connected to the first node N1. The second transistor T2 may be referred to as a scan transistor.

The third transistor T3 may have a gate electrode connected to the second scan line S2*i*, a first electrode connected to the second node N2, and a second electrode connected to the sensing line Ik. The third transistor T3 may be referred to as a sensing transistor.

The storage capacitor Cst may have a first electrode connected to the first node N1 and a second electrode connected to the second node N2.

The light emitting diode LD may have an anode connected to the second node N2 and a cathode connected to the second power line ELVSS. The light emitting diode LD may emit light of one of a first color, a second color, and a third color.

In general, a voltage of the first power line ELVDD may be greater than a voltage of the second power line ELVSS. However, in special situations, such as preventing the light emitting diode LD from emitting light, the voltage of the second power line ELVSS may be set to be greater than the voltage of the first power line ELVDD.

The sensing channel 151 may include a first switch SW1, a second switch SW2, and a sensing capacitor Css.

The first electrode of the first switch SW1 may be connected to the third node N3. For example, the third node N3 may correspond to the sensing line Ik. The second electrode of the first switch SW1 may receive the initialization voltage Vint. For example, a second electrode of the first switch SW1 may be connected to an initialization power source that supplies the initialization voltage Vint.

A first electrode of the second switch SW2 may be connected to the third node N3, and a second electrode thereof may be connected to the fourth node N4.

The sensing capacitor Css may have a first electrode connected to the fourth node N4 and a second electrode connected to a reference power source (e.g., ground).

Although not shown, the sensing unit 15 may include an analog-to-digital converter. For example, the sensing unit 15 may include analog-to-digital converters corresponding to the number of sensing channels. The analog-to-digital converter may convert the sensing voltage stored in the sensing capacitor Css into a digital value. The converted digital value may be provided to the timing controller 11 as sensing data. In another example, the sensing unit 15 may include analog-to-digital converters of the number smaller than the number of sensing channels and may convert the sensing signals stored in the sensing channels by time division.

Figure 4:
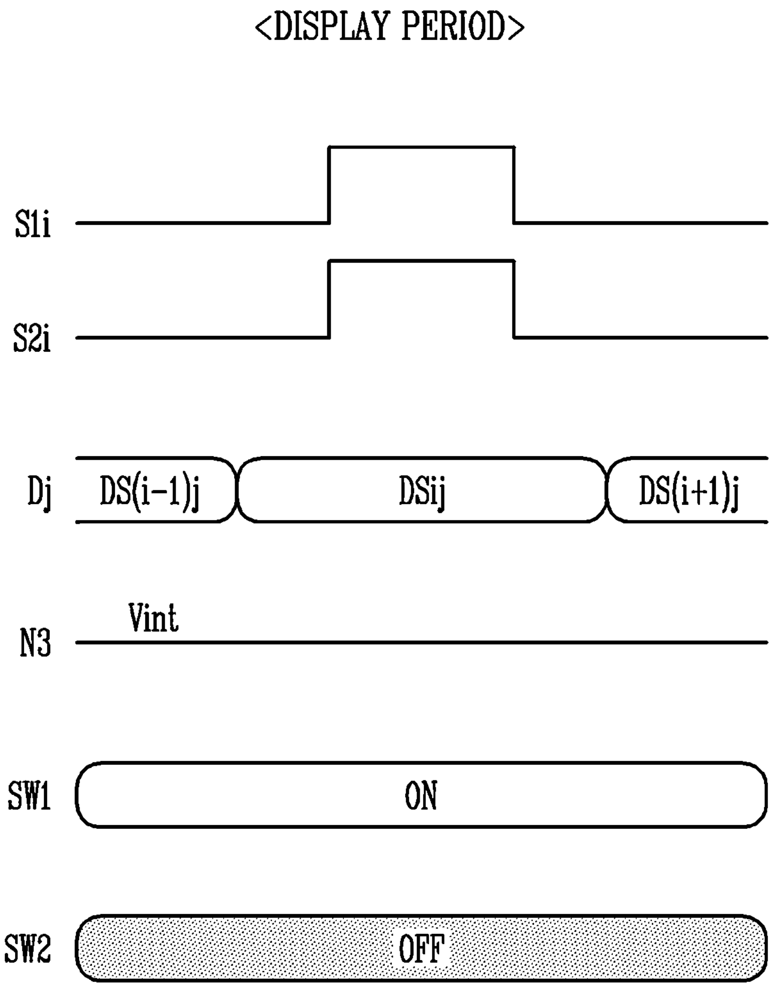
FIG. 4 is a drawing for illustrating a display period according to an embodiment of the present disclosure.

FIG. 4 is a drawing for illustrating a display period according to an embodiment of the present disclosure.

Referring to FIG. 4, the sensing line Ik, that is, the third node N3, may receive the initialization voltage Vint during the display period. During the display period, the first switch SW1 may be in a turn-on state and the second switch SW2 may be in a turn-off state.

During the display period, data voltages DS(i−1) j, DSij, and DS(i+1) j may be sequentially applied to the data line Dj in units of a horizontal period. A first scan signal at the turn-on level (e.g., logic high level) may be applied to the first scan line S1*i* in a horizontal period. Additionally, the second scan signal at the turn-on level may be applied to the second scan line S2*i* in synchronization with the first scan line S1*i*. In another embodiment, during the display period, the second scan line S2*i* may always be in a state where the second scan signal at the turn-on level is applied.

For example, when scan signals at the turn-on level are applied to the first scan line S1*i* and the second scan line S2*i*, the second transistor T2 and the third transistor T3 may be in a turn-on state. Accordingly, a voltage corresponding to the difference between the data voltage DSij and the initialization voltage Vint is written into the storage capacitor Cst of the sub-pixel SPij.

In the sub-pixel SPij, depending on the voltage difference between the gate electrode and the source electrode of the first transistor T1, an amount of driving current flowing in a driving path connecting the first power line ELVDD, the first transistor T1, the light emitting diode LD, and the second power line ELVSS, is determined. The light emitting luminance of the light emitting diode LD may be determined depending on the level of driving current.

Thereafter, when a scan signal at a turn-off level (e.g., logic low level) is applied to the first scan line S1*i* and the second scan line S2*i*, the second transistor T2 and the third transistor T3 may be in a turn-off state. Therefore, regardless of the change in voltage of the data line Dj, the voltage difference between the gate electrode and the source electrode of the first transistor T1 may be maintained by the storage capacitor Cst, and the light emitting luminance of the light emitting diode LD may be maintained.

Figure 5:
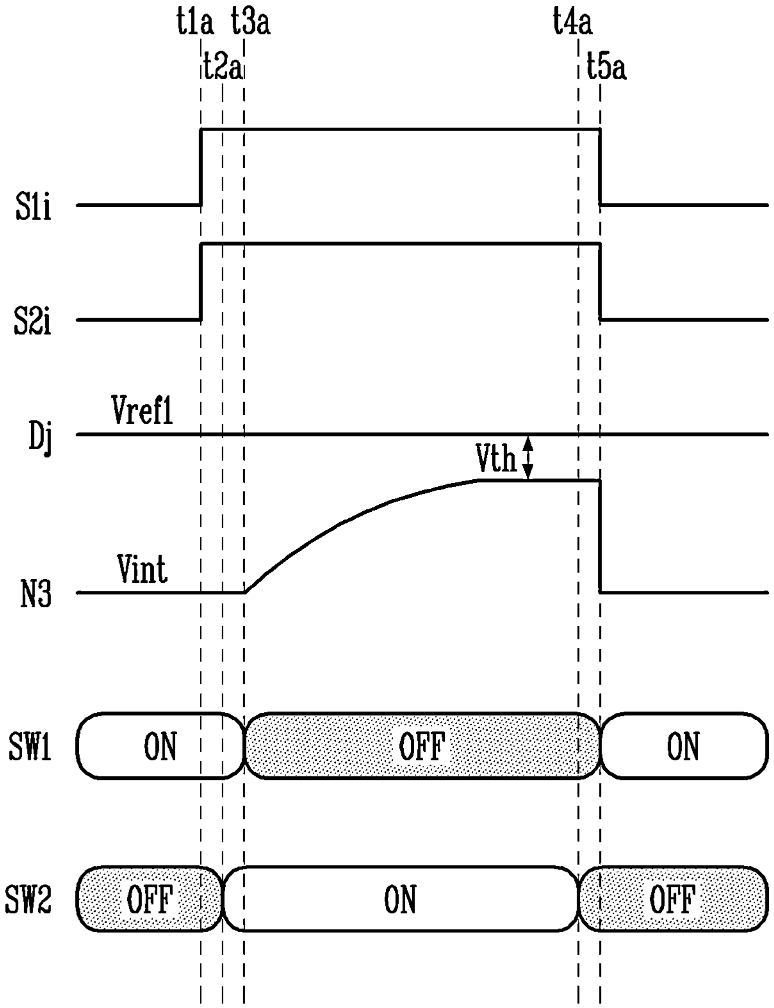
FIG. 5 is a drawing for illustrating a threshold voltage sensing period of a transistor according to an embodiment of the present disclosure.

FIG. 5 illustrates a threshold voltage sensing period of a transistor according to an embodiment of the present disclosure.

Before time t1*a*, the first switch SW1 may be in a turn-on state and the second switch SW2 may be in a turn-off state. Accordingly, the initialization voltage Vint may be applied to the third node N3. Additionally, the data driver 12 may supply the reference voltage Vref1 to the data line Dj.

At time t1*a*, a first scan signal at a turn-on level may be supplied to the first scan line S1*i*, and a second scan signal at a turn-on level may be supplied to the second scan line S2*i*. Accordingly, the reference voltage Vref1 may be applied to the first node N1, and the initialization voltage Vint may be applied to the second node N2. Accordingly, the first transistor T1 may be turned on depending on the difference between the gate voltage and the source voltage.

At time t2*a*, the second switch SW2 may be turned on. Accordingly, the first electrode of the sensing capacitor Css may be initialized to the initialization voltage Vint.

At time t3*a*, the first switch SW1 may be turned off. Accordingly, as current is supplied from the first power line ELVDD, the voltages of the second node N2 and the third node N3 may increase. In response to the voltage increase at the second node N2 and the third node N3 to the voltage (Vref1−Vth), the first transistor T1 turns off. With the first transistor T1 turned off, the voltage of the second node N2 and the third node N3 no longer increases. Since the fourth node N4 is connected to the third node N3 through the second switch SW2 which is in a turned-on state, the sensing voltage (Vref1−Vth) is stored in the first electrode of the sensing capacitor Css.

At time t4*a*, the second switch SW2 is turned off, so the sensing voltage Vref1−Vth of the first electrode of the sensing capacitor Css may be maintained. The sensing unit 15 can perform analog-to-digital conversion of the sensing voltage (Vref1−Vth), and thus may determine the threshold voltage (Vth) of the first transistor T1 of the sub-pixel SPij.

At time t5*a*, a first scan signal at a turn-off level may be supplied to the first scan line S1*i*, and a second scan signal at a turn-off level may be supplied to the second scan line S2*i*. Additionally, the first switch SW1 may be turned on. Accordingly, the initialization voltage Vint may be applied to the third node N3.

Figure 6:
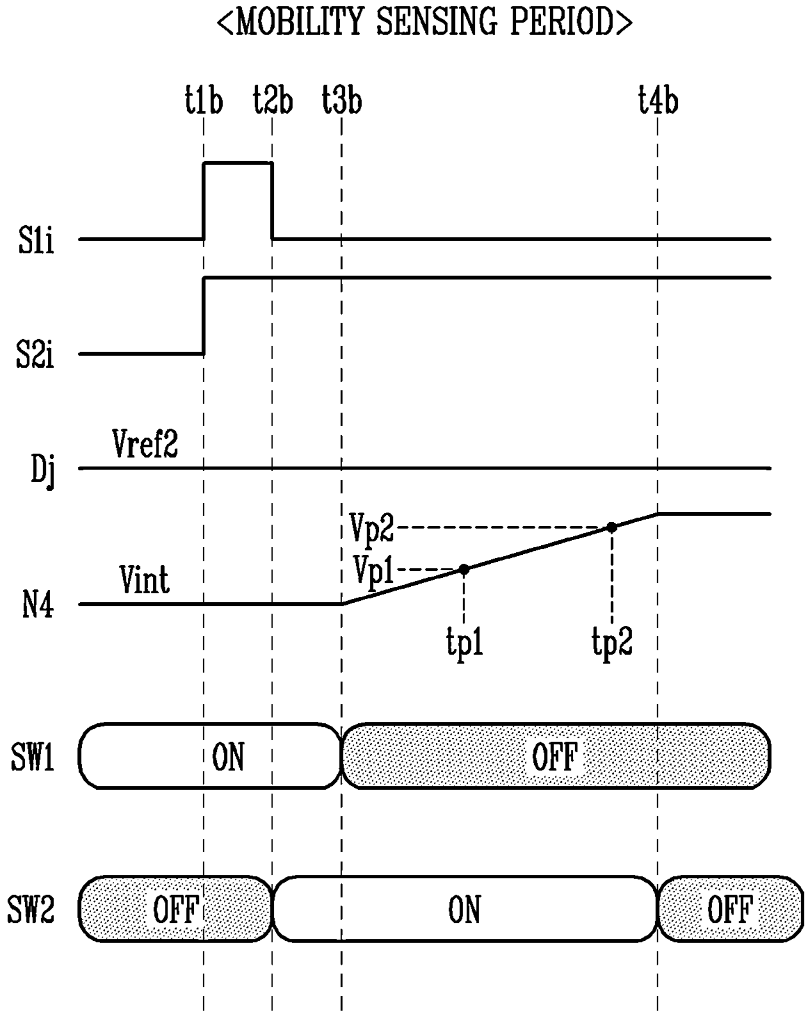
FIG. 6 is a drawing for illustrating a mobility sensing period according to an embodiment of the present disclosure.

FIG. 6 illustrates a mobility sensing period according to an embodiment of the present disclosure. The mobility sensing period allows determination of the mobility of the first transistor T1.

At time t1*b*, a first scan signal at a turn-on level may be applied to the first scan line S1*i*, and a second scan signal at a turn-on level may be applied to the second scan line S2*i*. At this time, since the reference voltage Vref2 is applied to the data line Dj, the reference voltage Vref2 may be applied to the first node N1. Additionally, since the first switch SW1 is in a turn-on state, the initialization voltage Vint may be applied to the second node N2 and the third node N3. Accordingly, the first transistor T1 may be turned on depending on the difference between the gate voltage and the source voltage.

At time t2*b*, as the first scan signal at the turn-off level is applied to the first scan line S1*i*, the first node N1 may be in a floating state. Additionally, when the second switch SW2 is turned on, the initialization voltage Vint may be applied to the fourth node N4.

At time t3*b*, the first switch SW1 may be turned off. Accordingly, as current is supplied from the first power line ELVDD through the first transistor T1, the voltages of the second, third, and fourth nodes N2, N3, and N4 increase. At this time, since the first node N1 is in a floating state, the gate-source voltage difference of the first transistor T1 may be maintained.

At time t4*b*, the second switch SW2 may be turned off. Accordingly, the sensing voltage is stored in the first electrode of the sensing capacitor Css. The sensing current of the first transistor T1 may be obtained as shown in Equation 1 below.

$$I = C * (Vp2 - Vp1) / (tp2 - tp1) \quad \text{[Equation 1]}$$

At this time, I is the sensing current of the first transistor T1, C is the capacitance of the sensing capacitor Css, Vp2 is the sensing voltage at the time (tp2), and Vp1 is the sensing voltage at the time tp1.

Assuming that a voltage slope of the fourth node N4 between time t3*b* and t4*b* is linear, the sensing voltage at time t3*b* and the sensing voltage at time t4*b* can be determined and the sensing current of the first transistor T1 can be calculated. Additionally, the mobility of the first transistor T1 can be calculated using the calculated sensing current. For example, the greater the sensing current, the greater the mobility. For example, a size of the mobility may be proportional to a size of the sensing current.

Figure 7:
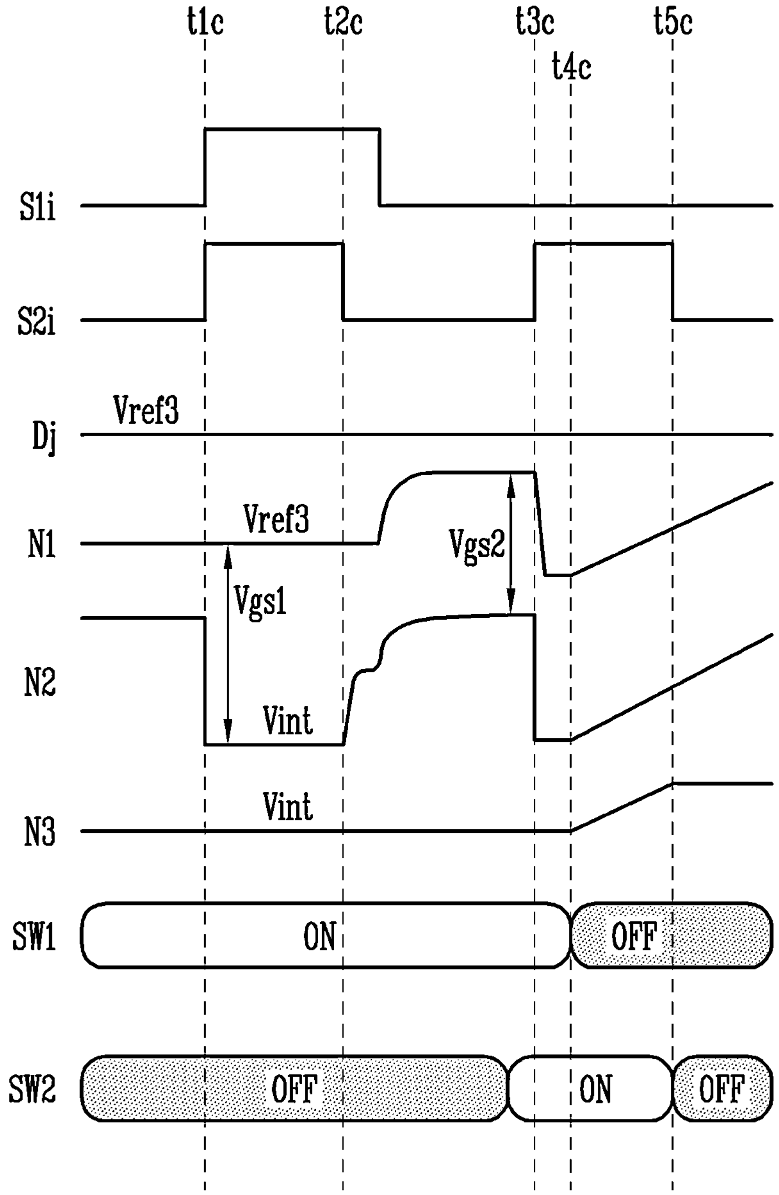
FIG. 7 is a drawing for illustrating a threshold voltage sensing period of a light emitting diode according to an embodiment of the present disclosure.

FIG. 7 is a drawing for illustrating a threshold voltage sensing period of a light emitting diode according to an embodiment of the present disclosure.

At time t1*c*, a first scan signal at a turn-on level may be applied to the first scan line S1*i*, and a second scan signal at a turn-on level may be applied to the second scan line S2*i*. At this time, since the reference voltage Vref3 is applied to the data line Dj, the reference voltage Vref3 may be applied to the first node N1. Meanwhile, since the first switch SW1 is in a turn-on state, the initialization voltage Vint may be applied to the second node N2 and the third node N3. Accordingly, the first transistor T1 may be turned on depending on the gate-source voltage Vgs1.

At time t2*c*, a second scan signal at a turn-off level may be applied to the second scan line S2*i*. Additionally, a first scan signal at a turn-off level may be applied to the first scan line S1*i* at time t2*c* or immediately thereafter. At this time, the voltage of the second node N2 increases due to the current supplied from the first power line ELVDD. Additionally, the voltage of the first node N1, which is coupled to the second node N2 and is in a floating state, also increases. At this time, the voltage of the second node N2 is saturated to a voltage corresponding to the threshold voltage of the light emitting diode LD. As a degree of deterioration of the light emitting diode LD increases, a voltage of the saturated second node N2 may increase. The gate-source voltage Vgs2 of the first transistor T1 may be reset by the voltage of the saturated second node N2. For example, the reset gate-source voltage Vgs2 may be smaller than the preset gate-source voltage Vgs1.

At time t3*c*, a second scan signal at a turn-on level may be applied to the second scan line S2*i*. Accordingly, the initialization voltage Vint may be applied to the second node N2. At this time, the reset gate-source voltage Vgs2 may be maintained by the storage capacitor Cst.

At time t4*c*, the first switch SW1 may be turned off. At this time, since the second switch SW2 is in a turned-on state, the voltages of the second node N2, third node N3, and fourth node N4 may increase. The greater the degree of deterioration of the light emitting diode LD (or the threshold voltage of the light emitting diode LD), the smaller the slope of the voltage increase.

At time t5*c*, a second scan signal at a turn-off level may be applied to the second scan line S2*i*, and the second switch SW2 may be turned off. Accordingly, the threshold voltage of the light emitting diode LD can be calculated using the sensing voltage stored in the sensing capacitor Css.

Figure 8:
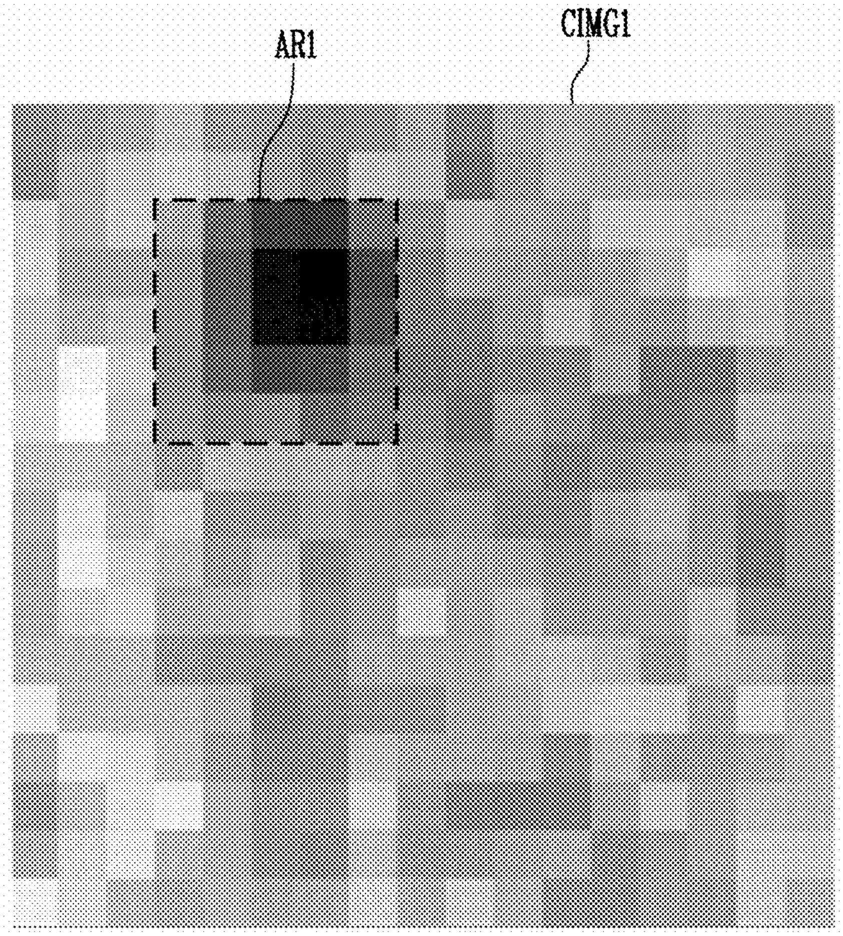
FIG. 8 is a drawing for illustrating a first camera image according to an embodiment of the present disclosure.

FIG. 8 is a drawing for illustrating a first camera image according to an embodiment of the present disclosure.

In illustrating the present disclosure with reference to FIGS. 8 to 17, each process may be performed in unit of the pixel or in unit of sub-pixel. For example, the process of generating at least one of the first camera image CIMG1, the second camera image CIMG2, the compensation data CDATA, the sensing data, the first compensation data CDATA1, the weights SWT, and the second compensation data CDATA2 may be performed for each of the first sub-pixels, second sub-pixels, and third sub-pixels (sub-pixel unit). The process of generating at least one of the first camera image CIMG1, the second camera image CIMG2, the compensation data CDATA, the sensing data, the first compensation data CDATA1, the weights SW), and the second compensation data CDATA2 may be performed for the first sub-pixels, the second sub-pixels, and the third sub-pixels (pixel unit) in a coordinated matter, for example at the same time or in a predetermined sequence. In some embodiments, the process of generating at least one of the first camera image CIMG1, the second camera image CIMG2, the compensation data CDATA, the sensing data, the first compensation data CDATA1, the weights SW), and the second compensation data CDATA2 may be performed on the first sub-pixels, the second sub-pixels, and the third sub-pixels independently, regardless of whether the process is being performed on other sub-pixels. Since it is impossible to describe the possibilities, the following description will be made based on a unit of pixel, but each embodiment is not limited thereto.

The camera 110 may generate the first camera image CIMG1 by photographing a test image displayed by pixels of the display device DD. It is assumed that the first camera image CIMG1 includes fine stains in the first area AR1. The first camera image CIMG1 may be photographing in unit of pixel, but may be in a blurred state due to limitations in the optical system (e.g., interference of light emitted from adjacent pixels, etc.). Therefore, the grayscale of each pixel in the first camera image CIMG1 cannot be completely trusted.

Figure 9:
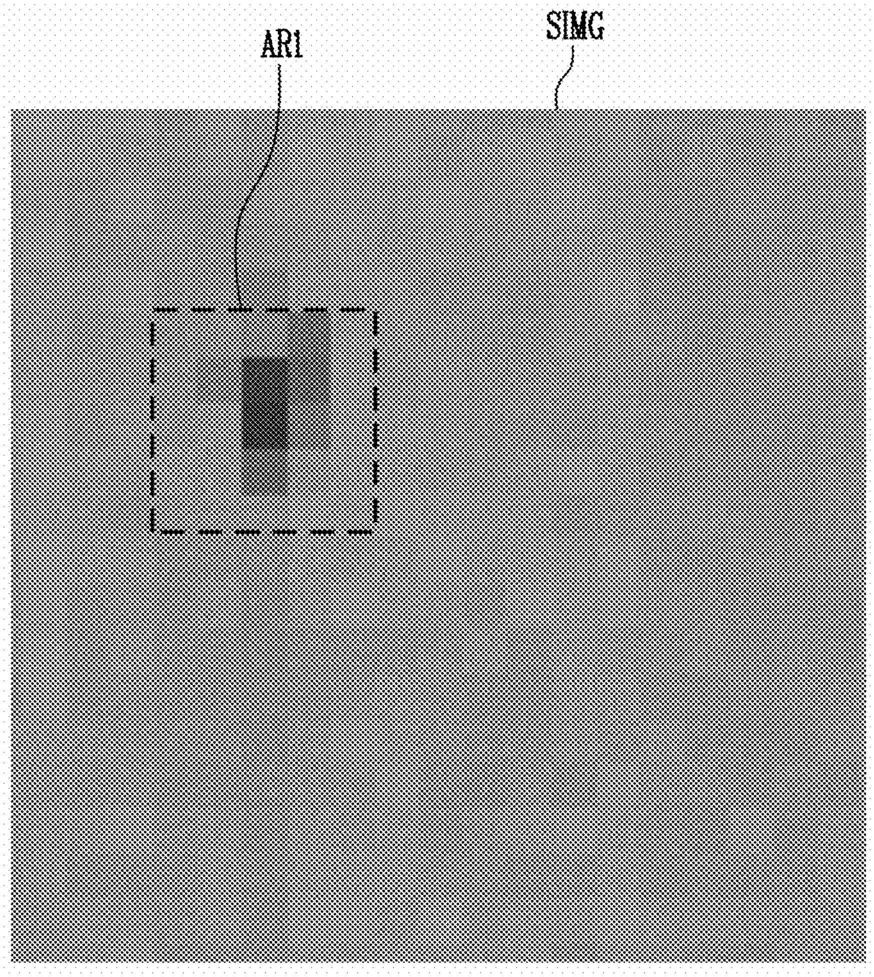

FIGS. 9 and 10 illustrate test outputs according to an embodiment of the present disclosure.

The test controller 120 may input a test current or test voltage to each pixel of the display device DD and sense corresponding test outputs. The test outputs may be at least one of the threshold voltages of the driving transistors of the pixels (see FIG. 5), the mobility of the pixels (see FIG. 6), and the threshold voltage of the light emitting elements of the pixels (see FIG. 7). The test outputs may refer to the sensing data described above.

For example, the test controller 120 may input a test current or test voltage to each pixel of the display device DD before the data driver 12 and the sensing unit 15 are mounted on the display device DD, and may sense the corresponding test outputs. In this case, the test controller 120 may replace the functions of the data driver 12 and the sensing unit 15.

For example, after the data driver 12 and the sensing unit 15 are mounted on the display device DD, the test controller 120 may input the test current or test voltage to the data driver 12 and the sensing unit 15, and may also receive test outputs sensed by the sensing unit 15.

The size of the test outputs may indicate the electrical characteristics of each pixel. For example, the test outputs may decrease in size as the threshold voltage of the driving transistors increases. For example, the test outputs may decrease as the transistor mobility decreases. For example, the test outputs may decrease as the threshold voltage of the light emitting elements increases. Referring to the table STAB1 in FIG. 10, test outputs for some pixels are shown as examples. Referring to FIG. 9, the sensing image SIMG that is expressed darker as the test outputs get smaller.

FIG. 11 is a drawing for illustrating weights according to an embodiment of the present disclosure.

Referring to the table STAB2 in FIG. 11, weights for some pixels are shown as examples.

The test controller 120 may generate weights for pixels based on the test outputs. The size of the weights may be set proportional to the size of the test outputs. For example, the smaller the size of the test output, the smaller the size of the corresponding weight.

Figure 12:
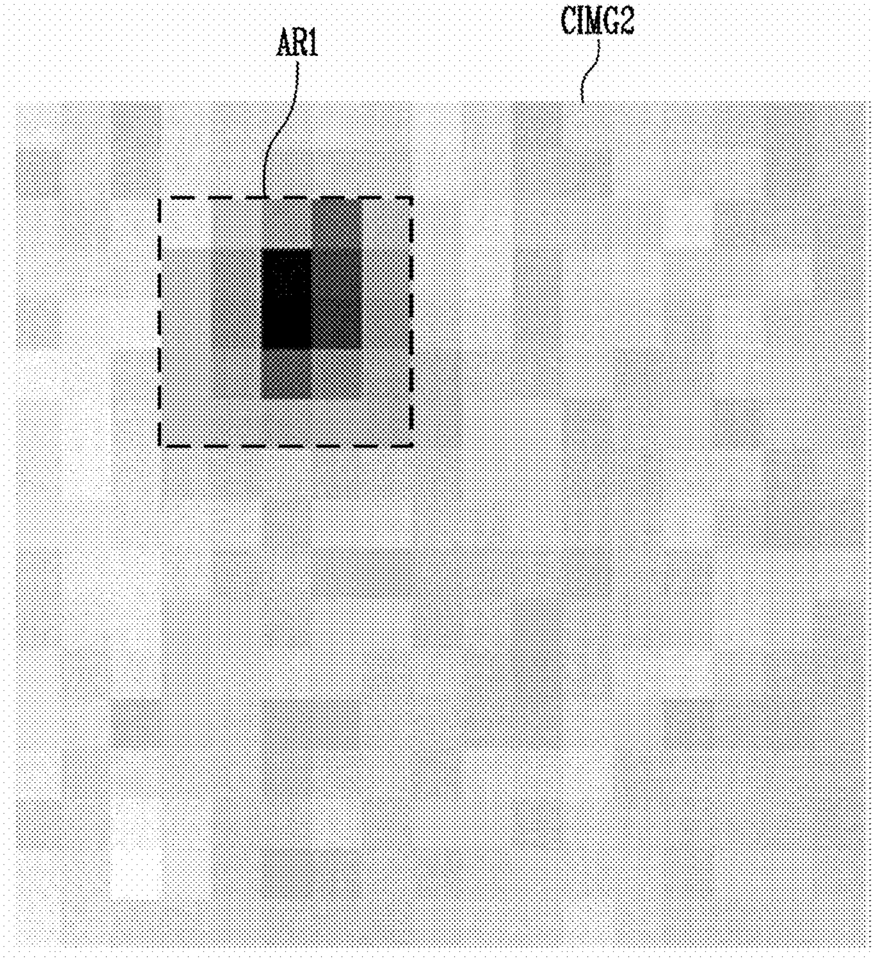
FIG. 12 is a drawing for illustrating a second camera image according to an embodiment of the present disclosure.

FIG. 12 illustrates a second camera image according to an embodiment of the present disclosure.

The test controller 120 may generate a second camera image CIMG2 by applying weights to the first camera image CIMG1. For example, the second camera image CIMG2 may be generated by multiplying the grayscales of the first camera image CIMG1 by weights corresponding to them. After this processing, the second camera image CIMG2 may be a normalized image. The second camera image CIMG2 may be a less-blurred version of the first camera image CIMG1.

Comparing FIGS. 8 and 12, the size of the stain disposed in the first area (AR1) of the first camera image CIMG1 may be larger than the size of the stain disposed in the first area AR1 of the second camera image CIMG2. That is, referring to the second camera image CIMG2, it is possible to overcome light interference caused by adjacent pixels or limitations of the optical system, and to accurately identify the pixel where fine stains occur.

Figure 13:
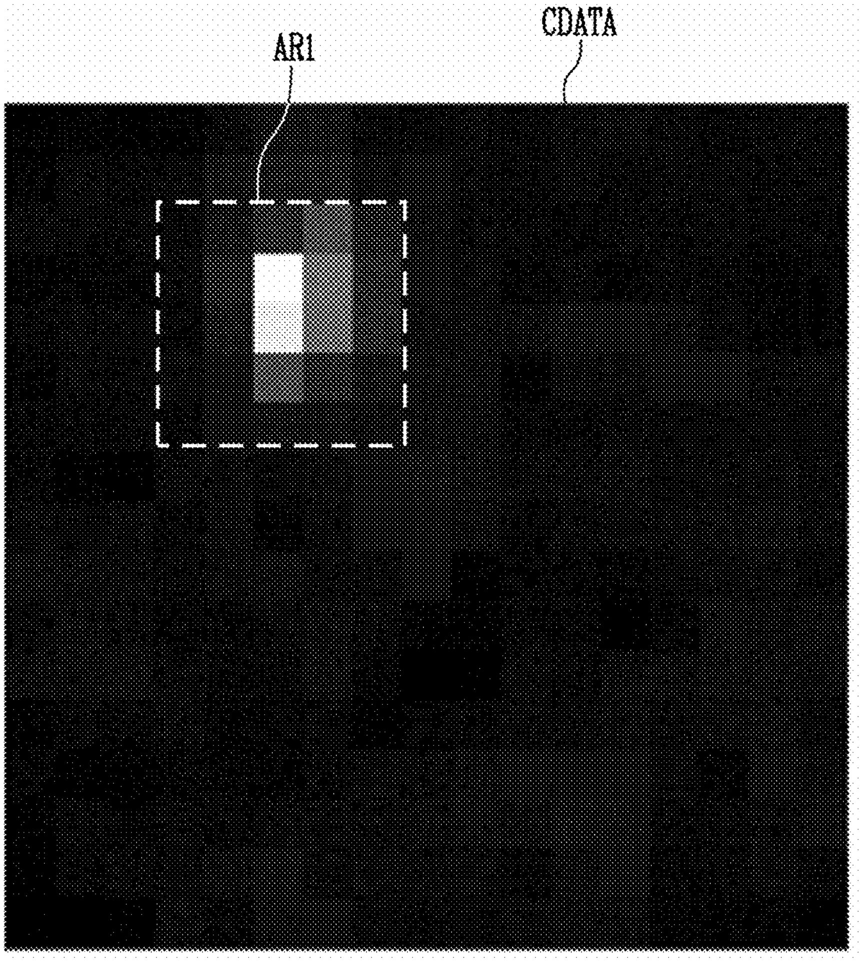
FIG. 13 is a drawing for illustrating compensation data according to an embodiment of the present disclosure.

FIG. 13 illustrates compensation data according to an embodiment of the present disclosure.

The test controller 120 may generate compensation data CDATA for pixels using the second camera image CIMG2. The compensation data CDATA may include compensation grayscales for pixels. In some embodiments, the size of the compensation data CDATA may be inversely proportional to the size of the grayscale data for the second camera image CIMG2. For example, the lower the grayscale of the second camera image IMG2 of the pixel, the higher the compensation grayscale of the compensation data CDATA.

Referring to FIGS. 1 and 2, the test controller 120 may store the compensation data CDATA in the memory 16 of the display device DD. However, the test controller 120 may not store the first camera image CIMG1 and the second camera image CIMG2 in the memory 16. As a result, the storage capacity required by the memory 16 can be reduced. For example, the timing controller 11 may generate output grayscales by adding compensation grayscales of the compensation data CDATA to the input grayscales.

Figure 14:
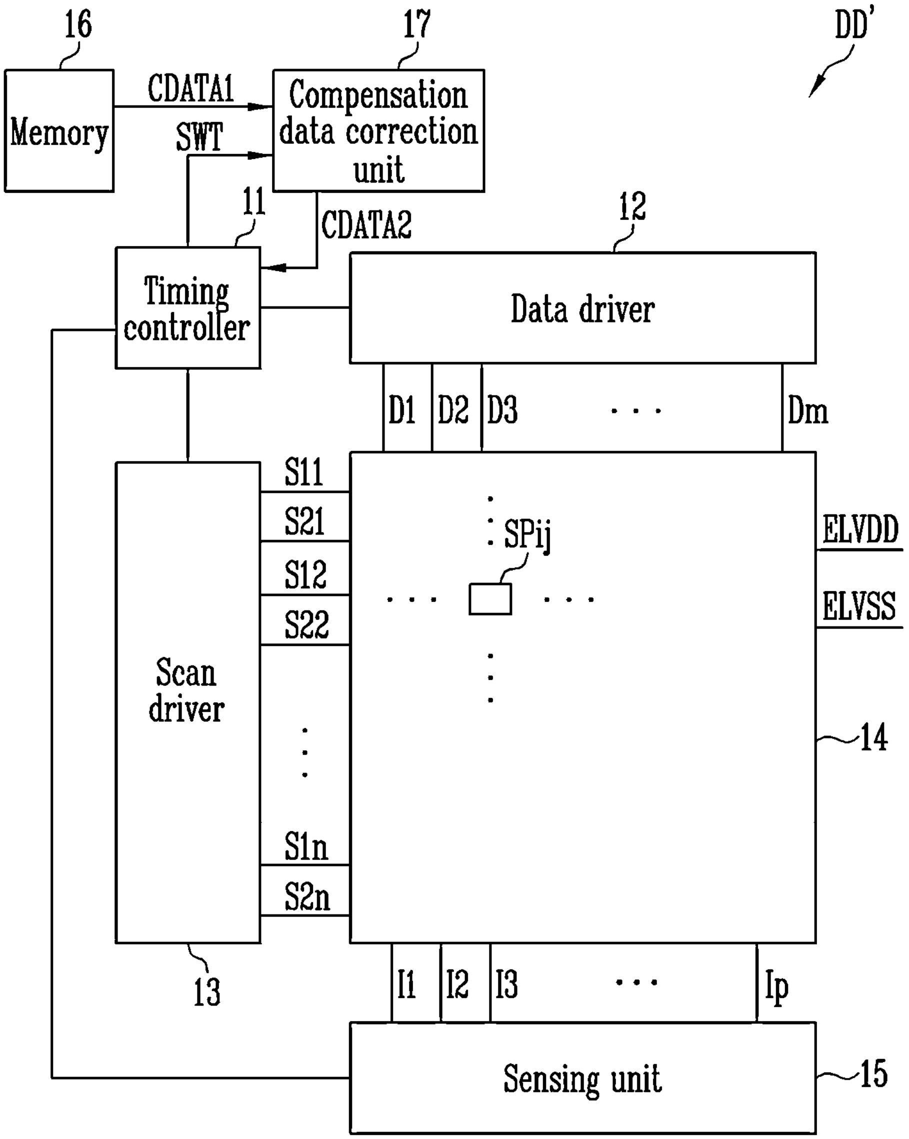
FIG. 14 is a drawing for illustrating a display device according to another embodiment of the present disclosure.
Figure 15:
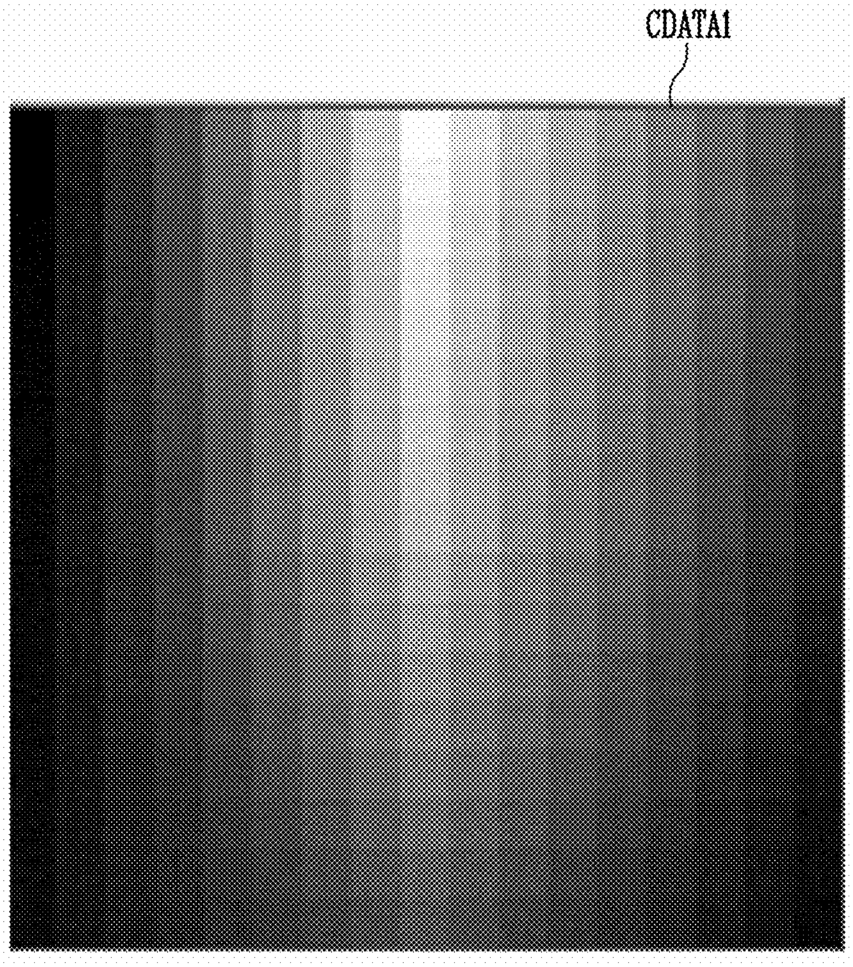
FIG. 15 is a drawing for illustrating first compensation data according to an embodiment of the present disclosure.
Figure 16:
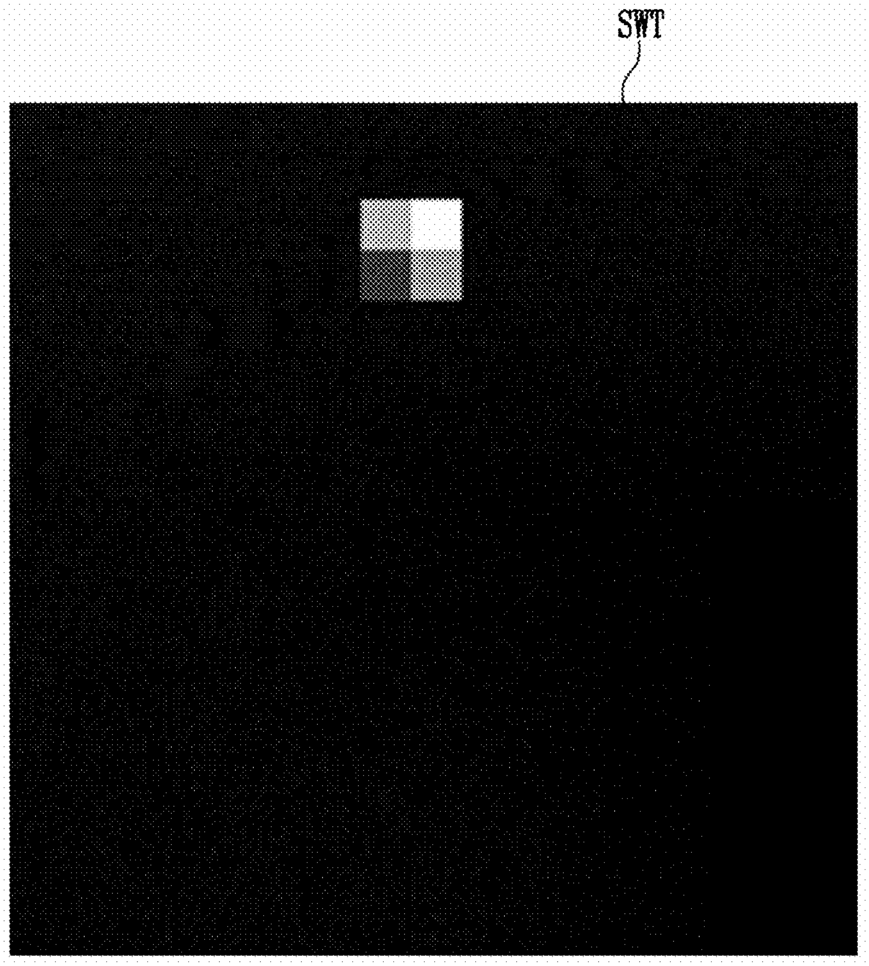
FIG. 16 is a drawing for illustrating weights according to an embodiment of the present disclosure.
Figure 17:
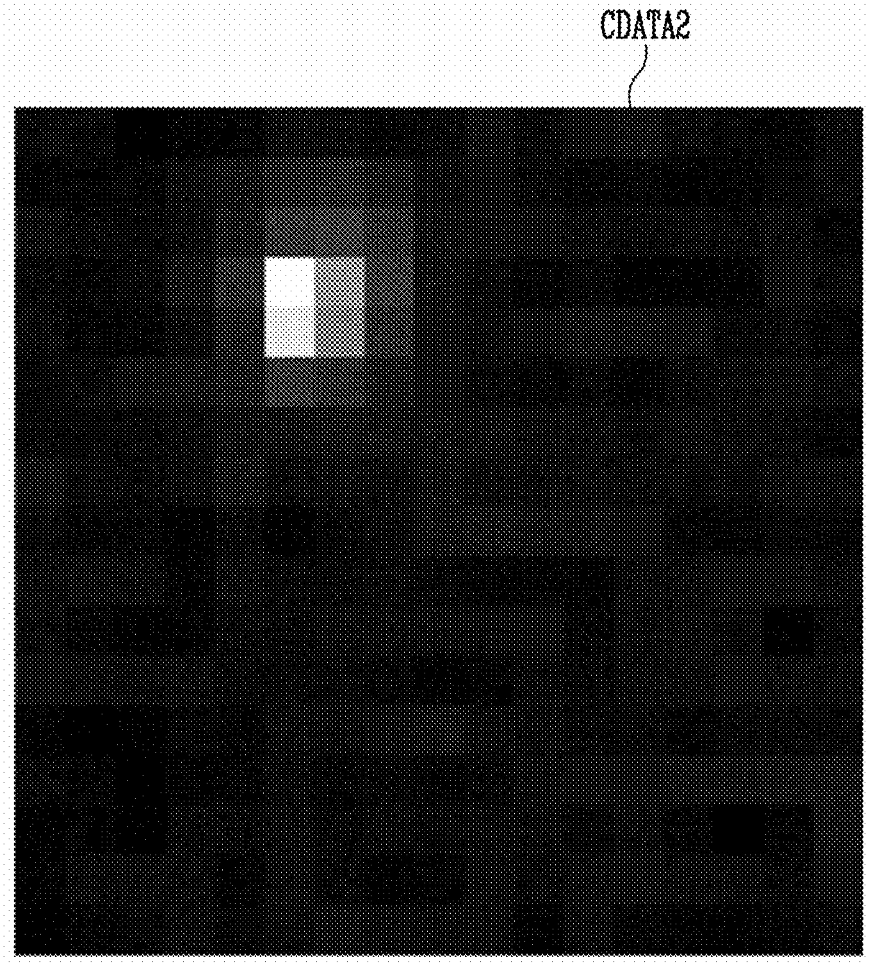
FIG. 17 is a drawing for illustrating second compensation data according to an embodiment of the present disclosure.

FIG. 14 illustrates a display device according to another embodiment of the present disclosure. FIG. 15 illustrates first compensation data according to an embodiment of the present disclosure. FIG. 16 illustrates weights according to an embodiment of the present disclosure. FIG. 17 is a drawing for illustrating second compensation data according to an embodiment of the present disclosure.

Referring to FIG. 14, the display device DD' differs from the display device DD of FIG. 2 in that it further includes a compensation data correction unit 17. Hereinafter, descriptions of components overlapping with the display device DD will be omitted.

The memory 16 may provide the first compensation data CDATA1, which is optical compensation data. At this time, the first compensation data CDATA1 may be optical compensation data that does not reflect the above-described test outputs.

The compensation data correction unit 17 may generate the second compensation data CDATA2 by applying weights SWT based on test outputs to the first compensation data CDATA1. The weights described in FIGS. 9 to 11 may be to be applied to the first camera image CIMG1, and the weights (SWT) described in FIG. 16 may be to be applied to the first compensation data CDATA1. That is, even if the test outputs based on the weights described in FIGS. 9 to 11 and the weights SWT described in FIG. 16 are the same, the data may be modified to suit each purpose. For example, as the test outputs become smaller, the weights described in FIGS. 9 to 11 may decrease. However, as the test outputs become smaller, the weights SWT described in FIG. 16 may increase.

The first compensation data CDATA1 of the memory 16 may be maintained without change. However, since the weights SWT are updated when the test outputs are updated, the second compensation data CDATA2 may be updated.

Here, the test outputs are not values generated by the test controller 120 of the generating device of compensation data ED. The test outputs may be values generated in real time by the sensing unit 15 of the display device DD during use of the display device DD. Therefore, the test outputs can be updated in real time.

The timing controller 11 may generate output grayscales by applying the second compensation data CDATA2 to the input grayscales for the pixels.

The data driver 12 may generate data voltages corresponding to output grayscales and supply them to the pixels.

According to one embodiment, unlike in the display device DD, the second compensation data CDATA2 may be updated depending on changes in the electrical characteristics of the pixel unit 14.

The drawings and the description of the present disclosure is intended to be illustrative, they were not used to limit the meaning or the scope of the present disclosure described in claims, but merely used to explain the present disclosure. Therefore, it will be understood by those skilled in the art that various modifications and equivalent other embodiments are possible therefrom. Hence, the real protective scope of the present disclosure shall be determined by the technical scope of the accompanying claims.

What is claimed is:

1. A method of compensating for pixel circuit differences in a display device, the method comprising:

displaying a test image of pixels of a display device;

generating a first camera image by photographing the test image;

applying a test input signal to each of the pixels and sensing corresponding test outputs, wherein the test input signal is at least one of a test current and a test voltage;

generating weights for the pixels based on the test outputs, wherein the test outputs comprise at least a threshold voltage of light emitting elements of the pixels;

generating a second camera image by applying the weights to the first camera image; and generating compensation data for the pixels based on the second camera image.

2. The method of claim 1, wherein a size of a stain disposed in a first area of the first camera image is larger than a size of a stain disposed in a corresponding area of the second camera image, the corresponding area and the first area representing the same part of a pixel of the pixels.

3. The method of claim 1, wherein the generating of the second camera image comprises multiplying the weights to corresponding grayscales of the first camera image.

4. The method of claim 1, further comprising:

storing the compensation data in a memory of the display device.

5. The method of claim 1, further comprising storing the compensation data in a memory of the display device without the first camera image and the second camera image.

6. The method of claim 1, wherein the compensation data includes compensation grayscales for the pixels, wherein a size of a compensation grayscale of the compensation data is inversely proportional to a size of a grayscale of the second camera image of the pixel.

7. The method of claim 1, wherein each of the pixels includes a first sub-pixel of a first color, a second sub-pixel of a second color, and a third sub-pixel of a third color, and the generating the first camera image, the generating the second camera image, and the generating the compensation data are independently performed for each of the first sub-pixel, the second sub-pixel, and the third sub-pixel.

8. The method of claim 1, wherein each of the pixels includes a first sub-pixel of a first color, a second sub-pixel of a second color, and a third sub-pixel of a third color, and the generating the first camera image, the generating the second camera image, and the generating the compensation data are performed for the first sub-pixel, the second sub-pixel, and the third sub-pixel in a coordinated order.

9. The method of claim 1 wherein the test outputs further comprise at least one of a threshold voltage of driving transistors of the pixels or a mobility of the pixels.

10. A device for generating compensation data for pixels, the device comprising:

a camera that generates a first camera image by photographing test images displayed by pixels of a display device; and a test controller that inputs a test input signal to each of the pixels and senses corresponding test outputs, the test input signal being a test current or a test voltage, wherein the test controller generates weights for the pixels based on the test outputs, wherein the test outputs comprise at least a threshold voltage of light emitting elements of the pixels, generates a second camera image by applying the weights to the first camera image, and generates compensation data for the pixels using the second camera image.

11. The device of claim 10, wherein a size of a stain disposed in a first area of the first camera image is larger than a size of a stain disposed in a corresponding area of the second camera image, the corresponding area and the first area representing the same part of a pixel of the pixels.

12. The device of claim 10, wherein the second camera image is generated by multiplying the weights to corresponding grayscales of the first camera image.

13. The device of claim 10, wherein the compensation data is stored in a memory of the display device.

14. The device of claim 13, wherein the compensation data is stored in the memory without the first camera image and the second camera image.

15. The device of claim 10, wherein the compensation data includes compensation grayscales for the pixels, and a size of a compensation grayscale of the compensation data is inversely proportional to a size of a grayscale of the second camera image of the pixel.

16. The device of claim 10 wherein the test outputs further comprise at least one of a threshold voltage of driving transistors of the pixels or a mobility of the pixels.

17. A display device comprising:

a plurality of pixels;

a sensing unit that senses corresponding test outputs from the pixels to which a test input signal is applied, the test input signal being at least one of a test current and a test voltage; wherein the test outputs comprise at least a threshold voltage of light emitting elements of the pixels, a memory that provides first compensation data that is optical compensation data; and a compensation data correction unit that generates second compensation data by applying weights based on the test outputs to the first compensation data.

18. The display device of claim 17, wherein the first compensation data is maintained without change, and when the test outputs are updated, the second compensation data is updated.

19. The display device of claim 17, further comprising:

a timing controller that generates output grayscales by applying the second compensation data to input grayscales for the pixels.

20. The display device of claim 19, further comprising:

a data driver that generates data voltages corresponding to the output grayscales and supplies the data voltages to the pixels.

* * * * *